United States Patent Office 2,884,404
Patented Apr. 28, 1959

2,884,404

CURABLE WATER-MISCIBLE COPOLYMER CONSISTING OF WATER-SOLUBLE POLYESTER AND GLYCOL DIACRYLATE

John A. Parker, Lancaster Township, Lancaster County, Pa., assignor to Armstrong Cork Company, Lancaster, Pa., a corporation of Pennsylvania No Drawing. Application May 31, 1955
Serial No. 512,292

5 Claims. (Cl. 260—45.4)

This invention relates to the preparation of certain complex modified polyesters suitable for use in the preparation of resinous products and the products produced therewith.

The object of this invention is to provide a curable resinous copolymer composed of a water-soluble polyester and a polymerizable polyglycol diacrylate, the polyester being carried to an intermediate stage of polymerization. Another object of the invention is to provide resinous products composed of a thermoset copolymer of a complex water-soluble polyester and a polymerizable polyglycol diacrylate.

To this end, the invention comprises the reaction product of a water-soluble polyester having an acid number between about 50 and 70 and a water-miscible glycol diacrylate. The polyester used in the present invention is the reaction product of an enedioic dibasic acid having not more than 6 carbon atoms, a polyglycol containing at least 3 ether linkages and not more than 2 hydroxyl groups, and a polyhydroxy alcohol having more than 2 hydroxyl groups.

The enedioic dibasic acids necessary to prepare the polyester used in the present invention are known in the art. Exemplary of these acids are fumaric, maleic, itaconic, citraconic, chloro maleic acids, and the anhydrides thereof. The use of one or the other of these acids modifies to some extent the properties of the final resinous product obtained, but in no case does the use of a different acid within the group change the properties sufficiently to take the product outside the scope of this invention. Due to cost consideration and others, fumaric acid is the acid of choice.

The second ingredient of the polyester used in the present invention is the polyglycol containing at least 3 ether linkages and having no more than 2 hydroxyl groups. As examples of such polyglycols, there may be mentioned hexaethylene glycol, tetraethylene glycol, pentaethylene glycol, and the higher homologues. The polyethylene glycol and polypropylene glycol series having molecular weights between 400 and 600 are preferred in the present invention.

The third ingredient of the polyester is the polyhydroxy alcohol having more than 2 hydroxyl groups. Examples of such compounds are glycerine, pentaerythritol, sorbitol, and the like.

In general, the relative amounts of the ingredients should be such that the equivalents of the two hydroxyl-containing constituents should be slightly in excess of the equivalents of the acidic constituents. It can be seen that the relative amounts of the 3 ingredients in the polyester should be placed on an aquivalent basis rather than on a mole basis, since only an equivalent basis takes into account the fact that polyhydric alcohols having, say 3 or 4 or more, hydroxyl groups in the molecule can be used interchangeably in the present invention. Although a certain amount of variation in the relative quantities of acidic constituents and hydroxyl constituents can be used, this variation must take place within certain limits. For every equivalent of acidic constituent, that is the enedioic dibasic acid, the amount of polyglycol may vary between about 0.5–0.7 equivalents. The same is true of the polyhydroxy alcohol constituent, that is, for each equivalent of dibasic acid, the equivalent weight of polyhydroxy alcohol having more than 2 hydroxyl groups may vary between about 0.5–0.7. Variation of amounts of ingredients outside these ranges leads to products that do not have the superior properties of the product of the present invention. It can be seen that the amount of hydroxyl-containing ingredients is slightly in excess of the amount of the acidic ingredient on an equivalent basis. This is true in order that the reaction may smoothly proceed to the end point and is in accordance with good polyester manufacturing procedure.

Preparation of the polyester itself is straightforward. The polyglycol may be heated to an elevated temperature, for example in the range of about 130°–200° C. under a blanket of inert gas, for example carbon dioxide. To the heated polyglycol the requisite amount of polyhydroxy alcohol and dibasic acid may be added and the reaction continued under the inert gas at a temperature in the range stated above. Water should be removed as usual during the course of the reaction.

It is necessary that a check of the acid number be maintained during the reaction, since it is essential that the reaction be terminated at an acid number in the range of about 50–75. If the reaction is carried to an acid number below about 50, the polyester will gel and become unsuitable for use in the present invention. If the acid number of the final product is above about 75, however, the resultant polyester hydrolyzes in water solution. It is only when the polyester reaction product has an acid number in the requisite range that it possesses the properties essential in carrying out the present invention.

At the termination of the reaction, the polyester may be cooled and dissolved in water, preferably to about 70% solids. It will be found that the polyester is completely soluble in water when prepared under the conditions outlined above. A clear, water-white solution results, which remains stable for periods at least greater than one year. Although 70% solids is the preferred concentration, a solids content in the range of about 60%–90% may be utilized. Where the final product is a water based paint, the solids content of the polyester solution may be varied to aid in control of the paint viscosity. Since the resinous polyester prepared as described above is to be formed into a resinous product to serve as a paint vehicle or other surface covering, it must be reacted with a glycol diacrylate. The term "glycol diacrylate" includes the glycol dimethacrylates as well as the polyglycol diacrylates and dimethacrylates. These compounds are prepared by esterification of water-soluble glycols with acrylic or methacrylic acid under controlled conditions. To be water-miscible, the glycol portion of the diacrylate must contain at least one ether linkage, if a polyglycol is used, or it must contain not more than 4 carbon atoms, if a monoglycol is used. The polyethylene, and polypropylene diacrylates are particularly suitable. The compounds should be capable of reacting with the polyester in water solution, hence they must be water-soluble or water-dispersible. Examples of some of the polyglycol diacrylates are diethylene glycol diacrylate and dimethacrylate, triethylene glycol diacrylate and dimethacrylate, dipropylene glycol diacrylate and dimethacrylate, and the like.

The amount of glycol diacrylate to be added to the polyester may vary from about 5 to about 30 parts by weight of diacrylate per 100 parts by weight of the polyester on a water-free basis. If less than about 5 parts diacrylate per 100 parts polyester are added, then the final resinous product does not possess the water- and solvent-resistance or the hardness usually desired in a film. More than about 30 parts diacrylate does not add any significant properties to the final product. Thus the final product should contain at least about 5 parts diacrylate per 100 parts polyester, and preferably 5-30 parts per 100 parts polyester.

The diacrylate such as the tetramethylene glycol dimethacrylate may simply be admixed with the polyester in water solution in any convenient manner. Since the glycol diacrylate reacts with the polyester in an aqueous medium, the diacrylate must be water-soluble or water-dispersible. This is simply to say that the diacrylate must be capable of reacting in a water medium. The term "water-miscible" as used herein is intended to define such reactability.

In order to accomplish cure within a reasonable time, a suitable polymerization catalyst such as any of the various organic peroxides should also be added to the polyester-comonomer mixture. Exemplary of the catalysts are benzoyl peroxide, ammonium persulfate, tertiary butyl perbenzoate, dicumyl peroxide, and other common free radical generators. These catalysts are added generally in an amount of about 0.5-3.0% catalyst based on the weight of resin solids. If desired, the catalyst may be admixed with the glycol diacrylate and the mixture may be added to the water solution of the polyester.

Once the organic peroxide catalyst has been added to the polymerizable mixture of water-soluble polyester and glycol diacrylate, the mixture is ready for use. It may be cast, sprayed, rolled, or otherwise placed as a covering on the desired object, for example, glass and metallic objects, wires, and the like.

Once the coating of the polymerizable mixture has been placed on the object, the coating must next be cured. This is done by heating the coating and maintaining it at an elevated temperature until sufficient cure is obtained. Temperatures in the range of about 200°-350° F. may be utilized. The time of curing will vary according to the temperature, with longer times being required at lower temperatures. On an average, a temperature of about 260° F. will call for a cure time of about 2 hours.

On cooling the cured film, it will be found that the film is hard, water- and solvent-resistant, flexible, and infusible, in addition to being clear and colorless. Thus, the resinous products of the present invention find applications as baking finishes of excellent gloss and superior hardness. Colorless films maintained their transparent properties without yellowing on aging. If desired, color may be imparted to the film by the addition of dyes and/or pigments as desired.

The following examples illustrate several embodiments of the invention. All parts are by weight unless otherwise stated.

EXAMPLE I

Preparation of the polyester

A polyester was prepared having the following ingredients in the amounts listed:

|  | Equivalents | Moles | Parts |
| --- | --- | --- | --- |
| Fumaric acid | 3.3 | 1.65 | 191.5 |
| Pentaerythritol | 2.0 | 0.5 | 68.1 |
| Polyethylene glycol 400 | 2.1 | 1.05 | 420 |

The polyethylene glycol 400 was heated to 150° C. under a blanket of $CO_2$. To this with good stirring was added the fumaric acid and the pentaerythritol. The mixture was held at a temperature of 160°-170° C. until no more distillate could be obtained. In about 5 hours, 48-50 parts of distillate were obtained with an acid number of the polyester of about 110. At this point, the gas flow was increased and the mixture heated at 175°-180° to an acid number of 70. The reaction mixture was then cooled down and diluted with water to 70% solids.

EXAMPLE II

Preparation of the resinous product

To samples of the polyester prepared in Example I are added varying amounts of tetramethylene glycol dimethacrylate. A series of 6 samples is prepared containing 5, 10, 15, 20, 25, and 30 parts tetramethylene glycol dimethacrylate, respectively, per 100 parts solid resin. To each mixture is added 1.0% benzoyl peroxide based on the total resin content, the resultant mixture is cast on glass, and cured at 260° F. for 2 hours.

Although all films are satisfactory, the best films are those containing 20-25 parts diacrylate per 100 parts resin. These films are very hard and clear and flexible but possess little elongation.

Another polymerizable composition is prepared by dissolving 0.1 part benzoyl peroxide in 3 parts of tetramethylene glycol dimethacrylate. This mixture is added to 11.4 parts of the polyester solution prepared as described in Example I, resulting in a diacrylate:polyester ratio of 37.5:100. Films prepared on glass and cured for 2 hours at 260° F. from this mixture show good properties, but are not superior to the films described above containing 20-25 parts diacrylate per 100 parts polyester.

EXAMPLE III

Using the method of Example I, a polyester having the following ingredients is prepared:

|  | Equivalents | Moles | Parts |
| --- | --- | --- | --- |
| Itaconic acid | 3.0 | 1.5 | 195.2 |
| Glycerol | 1.5 | 0.50 | 46.1 |
| Polyethylene glycol 600 | 1.5 | 0.75 | 450.0 |

The reaction mixture is cooled and diluted to 70% solids. A mixture of 69.1 parts ethylene glycol dimethacrylate and 10.4 parts benzoyl peroxide is thoroughly mixed into the polyester solution and the resultant mixture cast on glass and cured at 260° F. for 2 hours. Excellent films resulted.

EXAMPLE IV

To 143 parts of a 70% solids solution of the polyester prepared in Example III is added 15 parts tetraethylene glycol dimethacrylate and 2 parts benzoyl peroxide and the mixture is cast on glass and cured at 260° F. for 2 hours. Hard, clear, tough, films resulted.

I claim:

1. A composition comprising the reaction product of relative proportions of reactants consisting of (1) about 100 parts by weight on a water-free basis of a water-soluble polyester having an acid number between about 50 and 75, and (2) about 5-30 parts by weight of a water-miscible glycol diacrylate which is the reaction product of a water-soluble glycol selected from the group consisting of polyglycols containing at least one ether linkage and monoglycols containing not more than 4 carbon atoms, and a compound selected from the group consisting of acrylic acid and methacrylic acid, said polyester being the reaction product of (a) a dicarboxylic acid selected from the group consisting of fumaric acid, maleic acid, itaconic acid, citraconic acid, chloro maleic acid, and the anhydrides thereof, (b) a polyglycol containing at least three ether linkages in an amount of about 0.5-0.7 equivalent per equivalent of said dicarboxylic acid, and (c) a polyhydroxy alcohol selected from the group consisting of pentaerythritol, glycerin, and sorbitol in an amount of about 0.5–0.7 equivalent per equivalent of said dicarboxylic acid.

2. The composition according to claim 1 wherein said polyhydroxy alcohol comprises pentaerythritol.

3. A hard thermoset composition comprising the cured reaction product of the composition of claim 1.

4. A composition according to claim 1 wherein said glycol diacrylate comprises a polyglycol dimethacrylate.

5. A composition according to claim 1 wherein said compound under (a) is fumaric acid, said compound under (b) comprises polyethylene glycol having a molecular weight of about 400, and said compound under (c) comprises pentaerythritol.

References Cited in the file of this patent

UNITED STATES PATENTS

| | | |
|---|---|---|
| 2,129,722 | Woodhouse | Sept. 13, 1938 |
| 2,155,590 | Garvey | Apr. 25, 1939 |
| 2,407,479 | D'Alelio | Sept. 10, 1946 |
| 2,418,633 | Gould | Apr. 8, 1947 |
| 2,628,210 | Etchason et al. | Feb. 10, 1953 |
| 2,643,985 | Parker | June 30, 1953 |
| 2,679,493 | Anderson | May 25, 1954 |

OTHER REFERENCES

"Handbook of Chemistry & Physics," 35th edition, 1953–1954, Chemical Rubber Publishing Co.